United States Patent
Shibata et al.

(10) Patent No.: US 10,898,862 B2
(45) Date of Patent: Jan. 26, 2021

(54) HOLLOW FIBER MEMBRANE MODULE REPAIR METHOD AND HOLLOW FIBER MEMBRANE MODULE

(75) Inventors: Noritaka Shibata, Toyohashi (JP); Takashi Hinenoya, Toyohashi (JP); Takahiro Mori, Toyohashi (JP); Toshinori Tanaka, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/125,769

(22) PCT Filed: Jun. 15, 2012

(86) PCT No.: PCT/JP2012/065381
§ 371 (c)(1),
(2), (4) Date: Dec. 12, 2013

(87) PCT Pub. No.: WO2012/173232
PCT Pub. Date: Dec. 20, 2012

(65) Prior Publication Data
US 2014/0116935 A1    May 1, 2014

(30) Foreign Application Priority Data
Jun. 16, 2011   (JP) .................................. 2011-134318

(51) Int. Cl.
*B01D 65/10*   (2006.01)
*B01D 63/02*   (2006.01)
*B01D 69/08*   (2006.01)

(52) U.S. Cl.
CPC .......... *B01D 65/108* (2013.01); *B01D 63/02* (2013.01); *B01D 65/106* (2013.01); *B01D 69/08* (2013.01)

(58) Field of Classification Search
None
See application file for complete search history.

(56) References Cited

U.S. PATENT DOCUMENTS 3,527,841 A * 9/1970 Wicker .................. A61L 24/06
525/412
4,188,817 A * 2/1980 Steigelmann .......... B01D 61/38
73/40.7

(Continued)

FOREIGN PATENT DOCUMENTS

| EP | 0 564 253 A1 | 10/1993 |
| JP | 53-14837 A | 2/1978 |

(Continued)

OTHER PUBLICATIONS

Bleay et al., A smart repair system for polymer matrix composites, 32 COMPOS. PART A 1767, 1773 (2001).*

(Continued)

*Primary Examiner* — Krishnan S Menon
*Assistant Examiner* — Brad Gordon
(74) *Attorney, Agent, or Firm* — Oblon, McClelland, Maier & Neustadt, L.L.P.

(57) ABSTRACT

This repair method for a hollow fiber membrane module is a method for repairing a leaking section occurring in the hollow fiber membrane module, the repair method having a repair step for using a repair adhesive that hardens due to a composite curing function that comprises a moisture-curing function and a photo-curing function, to repair the leaking section.

8 Claims, 1 Drawing Sheet

(56) References Cited

U.S. PATENT DOCUMENTS

| | | | |
|---|---|---|---|
| 5,300,608 A | 4/1994 | Chu et al. | |
| 5,561,173 A * | 10/1996 | Dry | A61L 27/48 428/320.2 |
| 5,824,180 A | 10/1998 | Mikuni et al. | |
| 6,906,112 B1 * | 6/2005 | Wojciak | C08F 2/48 156/275.7 |
| 2009/0120048 A1 * | 5/2009 | Wertz | B01D 39/1623 55/521 |
| 2010/0029978 A1 * | 2/2010 | Swords | C09J 4/00 558/381 |
| 2011/0049043 A1 * | 3/2011 | Larson | B01D 63/10 210/494.1 |
| 2015/0233123 A1 * | 8/2015 | Amar | E04F 13/0866 52/797.1 |

FOREIGN PATENT DOCUMENTS

| | | | |
|---|---|---|---|
| JP | 62-57475 A | | 3/1987 |
| JP | 62 140607 | | 6/1987 |
| JP | 62 227409 | | 10/1987 |
| JP | 5 168875 | | 7/1993 |
| JP | 5-184886 A | | 7/1993 |
| JP | 7 136253 | | 5/1995 |
| JP | 07136253 | * | 5/1995 |
| JP | 07136253 A | * | 5/1995 |
| JP | 07136253 A | * | 5/1995 |
| JP | A07136253 | * | 5/1995 |
| JP | 9 249708 | | 9/1997 |
| JP | 2001 205056 | | 7/2001 |
| JP | 2001205056 A | * | 7/2001 |
| JP | 2003-277422 A | | 10/2003 |
| JP | 2008 31307 | | 2/2008 |
| JP | 2008031307 A | * | 2/2008 |
| JP | 2008037907 A | * | 2/2008 |
| KR | 10-2011-0001433 A | | 1/2011 |
| WO | WO 02/40140 A1 | | 5/2002 |

OTHER PUBLICATIONS

Jan W. Gooch, Biocompatible Polymeric Materials and Tourniquets for Wounds, 27 (2010).*
Li et al., Feasibility Study of a Passive Smart Self-Healing Cementitious Composite, 29B COMPOSITES 819, 820 (1998).*
International Search Report dated Aug. 14, 2012 in PCT/JP12/065381 Filed Jun. 15, 2012.
Extended European Search Report dated Oct. 7, 2014 in Patent Application No. 12800100.5.
S.M. Bleay et al., "A Smart Repair System for Polymer Matrix Composites", Composites: Part A: applied science and manufacturing, vol. 32, No. 12, XP-004309043, Dec. 1, 2001, pp. 1767-1776.
Office Action dated Dec. 20, 2013, in Japanese Patent Application No. 2012-531928 with English translation.
Office Action as received in the corresponding European Patent Application 12800100.5 dated May 28, 2018.
Office Action as received in the corresponding EP Patent Application No. 12800100.5 dated Jun. 13, 2019.
Office Action as received in the corresponding EP Patent Application No. 12800100.5 dated May 6, 2020, 6 pages.

* cited by examiner

HOLLOW FIBER MEMBRANE MODULE REPAIR METHOD AND HOLLOW FIBER MEMBRANE MODULE

TECHNICAL FIELD

The present invention relates to a method for repairing a hollow fiber membrane module used for filtration of untreated water in a tertiary treatment and the like for the purpose of sewage treatment; water treatment; purification of reclaimed water. The present invention also relates to the hollow fiber membrane module.

The present application claims priority based on Japanese Patent Application No. 2011-134318 filed on Jun. 16, 2011 in Japan, the content of which is incorporated herein by reference.

BACKGROUND ART

In recent years, hollow fiber membrane modules are becoming more popular as the size of membrane filtration equipment is increasing. A hollow fiber membrane module is immersed in an untreated water tank with the membrane exposed in order to filter untreated water. These hollow fiber membrane modules include, for example, one comprising multiple hollow fiber membranes arranged in a sheet form and two water catchment pipes provided at both ends of the hollow fiber membranes in the length direction. In the hollow fiber membrane module, both ends of each hollow fiber membrane are fixed within the respective water catchment pipes using a potting material, at least one end of which is in an open state.

In these hollow fiber membrane modules, foreign objects and the like contained in untreated water may damage the surfaces of the hollow fiber membranes, and the damaged area may become a leakage region (a region from which the untreated water leaks into the side of filtered water).

A leakage region may also be resulted from a poor manufacturing process when manufacturing the hollow fiber membrane modules. For example, when manufacturing the hollow fiber membrane modules, potting material may enter into gaps between hollow fiber membranes, and into gaps between hollow fiber membranes and water catchment pipes. Then the potting material may cure to fix the hollow fiber membranes together, and to fix the hollow fiber membranes with the water catchment pipes, respectively. However, during this step, air may remain in the potting material, resulting in incomplete isolation between the inside and outside of the hollow fiber membranes, which may become a leakage region Conventionally, in a case where a leakage region is resulted in this way, a repair method has been commonly used, the method comprising: closing the leakage region or sealing the end face of a hollow fiber membrane in which the leakage region is resulted by using a thermosetting resin-containing repair agent. However, since many of the currently used repair agents have been of a two-pack mixing type, and their curing time have been long, procedures are difficult and complicated.

In view of the situations as described above, repair technologies also have been developed as described in Patent Literatures 1 and 2. For example, Patent Literature 1 discloses a repair method in which one-pack ultraviolet curing resin is used, and Patent Literature 2 discloses a repair method in which hot melt resin is used.

[Patent Document 1] Japanese Unexamined Patent Application, Publication No. H7-136253
[Patent Document 2] Japanese Unexamined Patent Application, Publication No. H5-168875

SUMMARY OF THE INVENTION

Problems to be Solved by the Invention

However, these repair methods are not satisfactory in terms of repair workability as described above and strength in a repaired place.

The present invention was made in light of the aforementioned circumstances. An object of the present invention is to provide a repair method which shows excellent repair workability, strength in a repaired place and the like.

Means for Solving the Problems

[1] A method of repairing a leakage region occurring at a hollow fiber membrane module, the method comprising a repair step of repairing the leakage region with a repair agent, the agent being cured via multiple curing functions including a moisture curing function and a light curing function.

[2] The method of repairing a hollow fiber membrane module according to [1], wherein the repair step is performed after detecting the leakage region by pressurizing gas into the hollow fiber membrane module in the direction along filtration of the hollow fiber membrane module or in the direction opposite to filtration under a condition where the hollow fiber membrane module is immersed in water or an aqueous solution.

[3] The method of repairing a hollow fiber membrane module according to [1] or [2], wherein the leakage region is a defective place in a membrane surface of a hollow fiber membrane of the hollow fiber membrane module, and the repair step comprises applying the repair agent to the defective place.

[4] The method of repairing a hollow fiber membrane module according to any one of [1] to [3], wherein the repair agent contains a cyanoacrylate based component and a photopolymerization initiator.

[5] The method of repairing a hollow fiber membrane module according to any one of [1] to [3], wherein the repair agent contains a polymerizable silicon-containing component and a photopolymerization initiator.

[6] The method of repairing a hollow fiber membrane module according to any one of [1] to [5], wherein the repair agent has a viscosity of between 10 and 3000 mPa·s at room temperature before curing.

[7] The method of repairing a hollow fiber membrane module according to any one of [1] to [6], wherein the hollow fiber membrane of the hollow fiber membrane module has a water content of 90 mass % or less when performing the repair step.

[8] A hollow fiber membrane module, which is repaired by the method according to any one of [1] to [7].

Effects of the Invention

The repair method according to the present invention shows excellent repair workability, strength in a repaired place and the like.

EMBODIMENT FOR CARRYING OUT THE INVENTION

Now, the present invention is described in detail.

Figure 1:
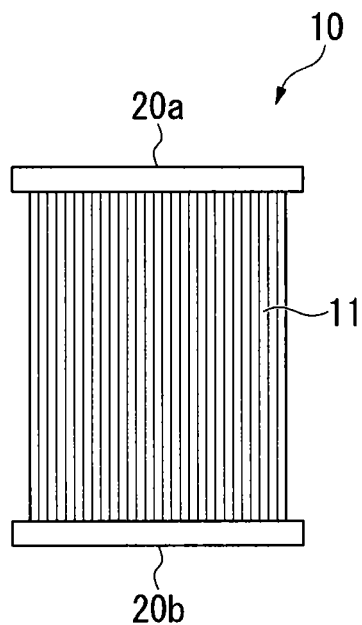
FIG. 1 shows a front view illustrating an example of a hollow fiber membrane module.

FIG. 1 shows a front view illustrating an example of a hollow fiber membrane module to be repaired by a method of repairing a leakage region according to the present invention.

The hollow fiber membrane module 10 has multiple hollow fiber membranes 11 arranged in the form of a sheet; water catchment parts comprising two water catchment pipes 20a, 20b provided at both ends of the hollow fiber membranes 11 in the length direction; and has a flat rectangular shape as a whole. The both ends of each hollow fiber membrane 11 are in an open state, and undetachably fixed within the water catchment pipes 20a, 20b with a potting material comprising polyurethane resin and the like. The hollow fiber membranes 11 are in communication with the flow paths in the water catchment pipes 20a, 20b.

The hollow fiber membrane module 10 shown in FIG. 1 is generally called an immersed membrane module. This module is immersed in an untreated water tank, and then suction filtration can be performed to obtain filtered water through an intake (not shown in the figure) provided with at least one of the end faces of the water catchment pipes 20a, 20b.

The fractionation level of the hollow fiber membranes 11 may be at any levels, for example, a level of microfiltration membrane (MF), a level of ultrafiltration membrane (UF), a level of nanofiltration membrane (NF) and the like. A pore size, porosity, membrane thickness, an outer diameter and the like are to be appropriately selected depending on the purposes of filtration. For example, in the case of a hollow fiber membrane intended for removing organic substances and viruses, preferably used is an ultrafiltration membrane, especially a hollow fiber membrane having a molecular cutoff in the range between tens of thousands and hundreds of thousands. Further, the outer diameter of the hollow fiber membrane 11 is, for example, between 0.1 and 10 mm, and preferably between 0.5 to 5 mm.

There is no limitation for the materials of the hollow fiber membranes 11 as long as they can be fabricated in the form of a hollow fiber membrane. They include, for example, cellulose based resins, polyolefine based resins, polyvinyl alcohol based resins, polysulfone based resins, polyacrylonitrile based resins, fluorine based resins, and the materials are chosen from one or more of them. Specifically, they include polyethylene, polypropylene, poly(vinylidene fluoride), polytetrafluoroethylene, polysulfone and the like.

Among these, a resin having excellent chemical resistance is preferably selected, and in particular, fluorine based resins are preferred. Among fluorine based resins, poly(vinylidene fluoride) (PVDF) is more preferred in terms of formativeness upon forming a hollow fiber membrane, chemical resistance and the like. Examples of poly(vinylidene fluoride) include a homopolymer of vinylidene fluoride as well as a copolymer in which poly(vinylidene fluoride) is co-polymerized with a monomer which is co-polymerizable with poly(vinylidene fluoride). Monomers which are co-polymerizable with poly(vinylidene fluoride) include, for example, vinyl fluoride, tetrafluoroethylene, trifluoroethylene, hexafluoropropylene, and the monomers are chosen from one or more of them.

The hollow fiber membranes 11 may have a hollow support in the interior to prevent fracture of a membrane during long term use. Supports include hollow monofilament yarn, knitted cord, braid or the like.

As a potting material for fixing the hollow fiber membranes 11 into the water catchment pipes 20a, 20b, thermosetting resins such as epoxy resin in addition to polyurethane resins described above are suitably used. The inside and outside of the hollow fiber membranes 11 are separated in the water catchment pipes 20a, 20b by a potting material.

Materials for the water catchment pipes 20a, 20b may be any materials as long as they have mechanical strength and durability. They include, for example, polycarbonate, polysulfone, polypropylene, acrylic resin, ABS resin, modified PPE resin, PPS resin, corrosion-resistant metal and the like. Those showing good adhesiveness with a potting material are preferably selected.

Immersed hollow fiber membrane modules having a flat rectangular shape as a whole as shown in FIG. 1 include Zeeweed500d from ZENON Environmental Inc., SADF2580 from Mitsubishi Rayon Co., Ltd. and the like. Such a hollow fiber membrane module 10 shows an excellent integration degree and washability when immersed in an untreated water tank since the module has a flat rectangular shape. Further, in its water catchment parts, the water catchment pipes 20a, 20b are undetachably fixed to the both ends of the hollow fiber membranes 11. Therefore, it has good pressure resistance and simple arrangement which is preferred in terms of the integration degree.

In addition, the structure and shape of the hollow fiber membrane module are not limited to the example shown in the Figure, but are appropriately selected depending on the size of an untreated water tank; the nature of components to be treated which are contained in untreated water; washability; and the like. For example, the water catchment pipes are not limited to a pipe having a rectangular cross section perpendicular to the axial direction, and include a pipe having a circular (ring shaped) cross section and the like. Further, a so-called immersed membrane module is shown as an example in FIG. 1, but the present embodiment is also applicable to a so-called pressurized membrane module in which untreated water is forced into the inner or outer periphery from the outer or inner periphery of a hollow fiber membrane respectively by pressurizing the untreated water to obtain filtered water. For example, cylindrical pressurized hollow fiber membrane modules include Microza UNA-600A, Microza UNA-620A from Asahi Kasei Corporation and the like.

Figure 2A:
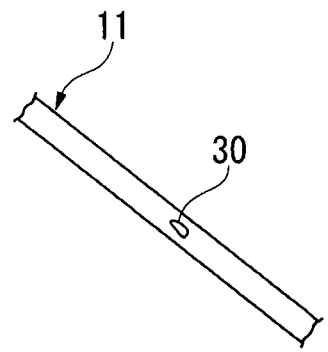
FIG. 2A shows a perspective view schematically illustrating a leakage region in a hollow fiber membrane.

In the hollow fiber membrane module 10, the membrane surface of the hollow fiber membrane 11 may be damaged during use by foreign objects contained in untreated water, resulting in a defective place such as a pinhole and a tear. Such a place may become a leakage region 30 as shown in FIG. 2A. Further, during manufacture of the hollow fiber membrane module 10, at gaps between hollow fiber membranes 11 and at gaps between the hollow fiber membranes 11 and the water catchment pipes 20a, 20b, manufacturing defects such as a poorly injected potting material may occur, and that area may become a leakage region. In addition, over the course of using the hollow fiber membrane module 10, a potting material may also be detached from the water catchment pipes 20a, 20b, resulting in a leakage region. A leakage region refers to a place in which isolation between the inside and outside of the hollow fiber membranes 11 is insufficient, and untreated water leaks into the side of filtered water.

Leakage inspection methods for detecting the leakage region 30 include an inspection method in which particles are used, a so-called suction method and the like. However, a method is preferred comprising: pressurizing gas into the hollow fiber membrane module 10 in the direction along filtration of the hollow fiber membrane module 10 or in the direction opposite to the filtration under a condition where the hollow fiber membrane module 10 is immersed in water or an aqueous solution; and identifying a leakage region by detecting the development of air bubbles. Specifically, examples include a method comprising pressurizing gas into the hollow fiber membrane module 10 under a condition where the hollow fiber membrane module 10 is immersed into an organic solvent such as an aqueous solution of ethanol; and a method comprising immersing the hollow fiber membrane module 10 in an aqueous solution of ethanol to hydrophilize its membrane surface, removing the hydrophilized hollow fiber membrane module 10 from the solution, and then pressurizing gas under a condition where the module is re-immersed in a water tank filled with water this time (for example, see Japanese Patent Laid-Open No. 2001-205056). Further, instead of an aqueous organic solvent, aqueous surfactant solution may be used.

These Leakage inspection methods in which pressurized gas is used have high detection sensitivity, and are widely used.

Note that the hollow fiber membrane module 10 as illustrated in the figure is in a form where the water catchment pipes 20a, 20b are undetachably fixed to the both ends of the hollow fiber membranes 11, and the end faces of the hollow fiber membranes 11 cannot be exposed. When performing leakage inspection for the hollow fiber membrane module 10 in this form using pressurized gas, preferably used is a method comprising pressurizing gas into the hollow fiber membranes 11 from the side of the water catchment pipes 20a, 20b, and identifying a place where air bubbles are developed from the hollow fiber membranes 11, i.e., a method in which gas is pressurized in the direction opposite to filtration.

The leakage region 30 detected in this way is then repaired using a curable repair agent having multiple curing functions (the repair step).

In this context, a curable repair agent having multiple curing functions refers to a resin based repair agent which starts to cure via at least two or more mechanisms. However, examples of this initiation of curing include, for example, secondary polymerization with macro monomers. A repair agent having such multiple curing functions advantageously has a quick curing time to allow the leakage region 30 to be quickly and uniformly repaired, showing excellent repair workability. It also shows excellent strength and durability in the repaired place. Specific examples of curing functions include light curing, heat curing, moisture curing and the like.

For the repair agents, one-pack repair agents in which have good pot life are preferred in terms of workability. Those having multiple curing functions can be appropriately selected from, for example, acrylic based adhesives, epoxy based adhesives, oxetane based adhesives, cyanoacrylate based adhesive, silicone based adhesives and the like.

A repair agent used in the present embodiment has at least a moisture curing function and a light curing function (an ultraviolet curing function) as multiple curing functions.

By using a repair agent having at least a moisture curing function, the hollow fiber membrane module 10 in a wet condition after detecting the leakage region 30 using a method in which pressurized gas is used as described above can be repaired without drying it using drying equipment. Further, a repair agent having a moisture curing function reacts with moisture contained in the hollow fiber membranes 11 to be cured. Therefore, the anchor effect is produced such that the agent well adheres to the hollow fiber membranes 11.

In a case where no drying is required before repairing, the amount of time needed for drying can be reduced. In addition, risk of hygrothermal contraction of hollow fiber membranes due to drying and subsequent change in effective membrane area can be avoided. Moreover, once hollow fiber membranes is dried, time consuming and troublesome re-hydrophilization of hollow fiber membranes is required when performing leakage re-inspection to check whether the leakage region is completely closed after repairing the leakage region, and when returning a hollow fiber membrane module to an untreated water tank. In contrast, in the case of no drying required before repairing, a step of re-hydrophilization is unnecessary, and the amount of time and effort can be both reduced. Further, change in the shape of hollow fiber membranes due to hygrothermal contraction by repeated drying and hydrophilization can also be avoided. Furthermore, in a case where drying is unnecessary before repairing, the hollow fiber membrane module 10 needs not be transferred to a facility where drying equipment is located, and the module can be promptly repaired in situ, i.e., at a water treatment plant, a sewage treatment plant and the like. This can significantly reduce time and effort required for the work associated with repairing the leakage region 30, leading to markedly increased working efficiency at worksites.

Note that when using conventional repair agents comprising an ultraviolet curing resin which is cured only by ultraviolet radiation and a hot melt resin, drying the leakage region is essential for repair pretreatment. If the leakage region is not dried, these repair agents do not well adhere to the leakage region.

When a repair agent having a light curing function in conjunction with a moisture curing function as described above is used, a region which moisture cannot easily permeate (for example, the interior region and the surface side of the repair agent) can be cured via a light curing function. On the other hand, a region which light energy cannot easily reach (for example, the deep part of the repair agent) can be cured via a moisture curing function. As a result, the repair agent in the repaired place shows a high degree of cross-linking. Even if immersed in water after curing, it will not swell or deteriorate, but will show excellent strength and durability.

Repair agents having a light curing function refer to those in which curing is initiated by ultraviolet irradiation and progresses until practical strength is obtained, and in which subsequently, the practical strength can be maintained even after the ultraviolet irradiation stops. Those having characteristics such as curing in the order of seconds after ultraviolet irradiation are preferred.

For repair agents having a light curing function, preferred are those containing a photopolymerization initiator having a reaction wavelength between 100 and 400 nm, which can avoid the influence from visible light (indoor scattering light). Further, an LED ultraviolet lamp commonly used as an ultraviolet irradiation device most abundantly emits light around 350 nm. Repair agents containing a photopolymerization initiator having the absorption maximum at around 350 nm can be preferably used in view of efficiency, cost and resource saving.

Repair agents having a moisture curing function and a light curing function as multiple curing functions include, for example, those containing a cyanoacrylate based component and a photopolymerization initiator; and those containing a polymerizable silicon component and a photopolymerization initiator. Among these, repair agents containing a cyanoacrylate based component and a photopolymerization initiator is preferred in terms of solvent resistance and adhesive strength.

Cyanoacrylate based components include cyanoacrylate monomers represented by the chemical formula: $H_2C=C(CN)—COOR$.

R represents, for example, a substituent selected from C1 to C15 alkyl, alkoxy alkyl, cycloalkyl, alkenyl, aralkyl, aryl, allyl and haloalkyl.

Specific examples of cyanoacrylate monomers include methyl cyanoacrylate, ethyl-2-cyanoacrylate, propyl cyanoacrylate, butyl cyanoacrylate (for example, n-butyl-2-cyanoacrylate and the like), octyl cyanoacrylate, allyl cyanoacrylate, β-methoxyethyl cyanoacrylate and combinations thereof. Among these, ethyl-2-cyanoacrylate is particularly preferred.

The amount of a cyanoacrylate based component contained in a repair agent is preferably 50 to 98 mass %, more preferably 75 to 95 mass % and even more preferably 85 to 90 mass %.

Polymerizable silicon-containing components include silicon-containing monomers; and silicon-containing oligomers and macromonomers having a repeating unit of the silicon-containing monomers. In this context, examples of silicon-containing monomers can be compounds having two or more alkoxy silyl groups (for example, alkyltrimethoxysilane such as vinyltrimetoxysilane, and aminoalkyltrimethoxysilane such as 3-aminopropyl triethoxysilane). Further, in any of these silicon-containing monomers, silicon-containing oligomers or macromonomers, some of unreacted alkoxysilyl groups may be hydrolyzed to a silanol group. In this case, one or more polymerizable silicon components can be used.

There is no particular limitation for photopolymerization initiators, but photopolymerization initiators commercially available from Ciba Specialty Chemicals, Tarrytown, N.Y. under the product name of "IRGACURE" and under the product name of "DAROCUR" are preferred.

Specific examples of these photopolymerization initiators are shown below. They include:

(1) "IRGACURE" 184 (1-hydroxycyclohexylphenylketone)

(2) "IRGACURE" 907 (2-methyl-1-[4-(methylthio)phenyl]-2-morpholinopropane-1-one)

(3) "IRGACURE" 369 (2-benzyl-2-N,N-dimethylamino-1-(4-morpholinophenyl)-1-butanone)

(4) "IRGACURE" 500 (the combination of 1-hydroxycyclohexylphenylketone and benzophenone)

(5) "IRGACURE" 651 (2,2-dimethoxy-2-phenylacetophenone)

(6) "IRGACURE" 1700 (the combination of bis(2,6-dimethoxybenzoyl-2,4,4-trimethylpentyl)phosphine oxide and 2-hydroxy-2-methyl-1-phenylpropan-1-one)

(7) "IRGACURE" 819 (bis(2,4,6-trimethylbenzoyl)phenylphosphine oxide)

(8) "DAROCUR" 1173 (2-hydroxy-2-methyl-1-phenyl-1-propane)

(9) "DAROCUR" 4265 (the combination of 2,4,6-trimethylbenzoyldiphenylphosphine oxide and 2-hydroxy-2-methyl-1-phenylpropan-1-one)

(10) Visible (blue) photopolymerization initiators

(11) dl-camphorquinone

(12) "IRGACURE" 784DC.

Other photopolymerization initiators useful in the present embodiment include alkyl pyruvates (for example, methyl pyruvate, ethyl pyruvate, propyl pyruvate, butyl pyruvate and the like), aryl pyruvates (for example, phenyl pyruvate, benzyl pyruvate and the like) and derivatives in which a portion of these compounds is substituted with a substituent.

Among them, particularly suitable photopolymerization initiators for use in the present embodiment include ultraviolet light initiators such as 2,2-dimethoxy-2-phenylacetophenone (for example: "IRGACURE" 651), 2-hydroxy-2-methyl-1-phenyl-1-propane (for example: "DAROCUR" 1173) and bis(2,4,6-trimethylbenzoyl)phenylphosphine oxide (for example: "IRGACURE" 819); ultraviolet/visible light initiators in which bis(2,6-dimethoxybenzoyl-2,4,4-trimethylpentyl)phosphine oxide and 2-hydroxy-2-methyl-1-phenylpropan-1-one are combined (for example: "IRGACURE" 1700); visible light initiators such as (Bis($\eta^5$-2,4-cyclopentadiene-1-yl)bis[2,6-difluoro-3-(1H-pyrrol-1-yl)phenyl]titanium (for example: "IRGACURE" 784DC)) and the like.

Figure 2B:
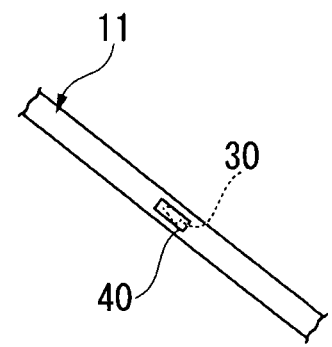
FIG. 2B shows a perspective view schematically illustrating the leakage region to which a repair agent is applied.

When performing the repair step using a repair agent having a light curing function along with a moisture curing function, a repair agent 40 is allowed to adhere so that the leakage region 30 on the membrane surface of the hollow fiber membrane is closed as shown in FIG. 2B while the periphery of the leakage region 30 is at least in a wet condition without drying the hollow fiber membrane module 10 with drying equipment after leakage inspection. Methods for adhesion include a method in which the repair agent 40 is dropped and a method in which the repair agent 40 is applied. By adhesion of the repair agent 40 as described above, the repair agent 40 readily reacts with moisture in the hollow fiber membrane 11 to undergo moisture curing. Subsequently, the adhered repair agent 40 is irradiated with ultraviolet light using an ultraviolet light irradiation device.

Thereby, the repair agent 40 well adheres to the periphery of the leakage region 30 via the anchor effect due to the reaction with moisture in the hollow fiber membrane 11, and is sufficiently cured by ultraviolet irradiation even at regions which moisture cannot easily permeate. Therefore, the repair agent 40 at the repaired place has strength and durability resulting from the anchor effect and a high degree of cross-linking, and will neither swell nor deteriorate even when re-immersed in an untreated water tank.

Note that a wet condition refers to a condition in which moisture adheres to a finger and the like when a hollow fiber membrane is lightly pressed with the finger and the like. Further, "the periphery of the leakage region" refers to a region to which a repair agent is allowed to adhere for the purpose of closing the leakage region. A repair agent usually adheres in the area surrounding the leakage region for 3 to 5 cm in the length direction of the hollow fiber membrane.

Further, the hollow fiber membrane module 10 of the example in FIG. 1 is in a form where the water catchment pipes 20a, 20b are undetachably fixed to the both ends of the hollow fiber membranes 11, and the end face of the hollow fiber membranes 11 cannot be exposed. Therefore, a repair method is used comprising directly closing the leakage region 30 with the repair agent 40, but a repair method comprising sealing the end face of the hollow fiber membrane on which a leakage region occurs cannot be used.

In addition to the above LED ultraviolet lamp (UV-LED), other ultraviolet light irradiation devices also include, for example, a metal halide lamp, a high pressure mercury vapor lamp, an ultrahigh pressure mercury lamp, a deep ultraviolet lamp, a lamp in which a mercury lamp without electrodes is excited from outside using microwave, ultraviolet laser, a xenon lamp and the like. Among these, an LED ultraviolet lamp in which UV-LED is used as a light source can easily be switched between turn-on (irradiation) and turn-off as compared with, for example, other ultraviolet lamps and the like. Therefore, preferably, for repair work in which turn-on (irradiation) and turn-off are repeated, the timing of ultraviolet irradiation can be appropriately controlled in an easy fashion.

Viscosity of the repair agent 40 before curing affects repair workability, durability at the repaired place and the like. Preferred viscosity of the repair agent 40 varies depending on the size of the leakage region 30 and the like. A repair agent which is in a paste form at room temperature (23° C.) at above 1 mPa·s can be used, but it is preferably at between 10 and 3000 mPa·s and more preferably at between 100 and 1000 mPa·s.

In a case where the viscosity is above the upper limit of the aforementioned range, even when the repair agent 40 adheres to the periphery of the leakage region 30 in a wet condition, penetration of the repair agent 40 in the thickness direction is difficult, and substitution and cross-linking reactions with moisture contained inside the membrane are difficult. As a result, the anchor effect is decreased due to the reaction of the repair agent 40 with moisture contained in the hollow fiber membrane 11, and durability for prolonged use of the repaired hollow fiber membrane module tends to be reduced. Further, when the viscosity is above the upper limit of the aforementioned range, the thickness of the applied repair agent 40 becomes larger, and ultraviolet light cannot easily reach the deep part of the repair agent 40. Therefore, curing of the repair agent 40 becomes weaker near the interface between the membrane surface of the hollow fiber membrane 11 and the repair agent 40. As a result, if irradiation time of ultraviolet light is not lengthened, durability of the repaired place tends to be reduced. On the other hand, when the viscosity is below the lower limit of the aforementioned range, the repair agent 40 disadvantageously spreads over a large area around the leakage region 30, and the sufficient thickness of the repair agent 40 is difficult to be maintained. As a result, a sufficient anchor effect is not obtained, and durability for prolonged use of the repaired hollow fiber membrane module tends to be reduced. Moreover, pores which are not in need of repair may be closed with the repair agent 40, and may reduce the membrane area.

Preferably, an example of the repair agent 40 having a light curing function along with a moisture curing function and showing a viscosity within the aforementioned range is a cyanoacrylate based light curing instantaneous adhesive containing a photopolymerization initiator and ethyl-2-cyanoacrylate, the initiator having an absorption maximum wavelength at or near 365 nm, which is widely used as a wavelength for an ultraviolet lamp. Examples of the above cyanoacrylate based light curing instantaneous adhesive include Loctite #4305 from Henkel and #1773E from Three-Bond Co., Ltd.

For the preferred wet condition when performing the repair step, the water content of the hollow fiber membrane is 90 mass % or less. When the water content is above 90 mass %, the repair agent 40 may not sufficiently adhere to the damaged area at the periphery of the leakage region 30, and may flow off. Therefore, water droplets on the surface of the hollow fiber membrane to be repaired may be wiped with water absorption paper (waste paper and the like) to absorb water on the surface in order to reduce the water content to 90 mass % or less. On the other hand, a preferred lower limit of the water content is 30 mass % and a more preferred lower limit is 50 mass %. In a case where the water content is less than 30 mass %, the moisture curing function of the repair agent may not fully function, for example, when ambient air is dry.

Here, the water content of a hollow fiber membrane is measured beforehand using a sample of the hollow fiber membrane.

For example, when a hollow fiber membrane immersed in a hydrophilic liquid such as a hydrophilizing agent, water and an aqueous solution for leakage inspection and the like is removed from the liquid and left to stand at room temperature (23° C.), the water content of the hollow fiber membrane becomes smaller as the time allowed to stand becomes longer. Therefore, if the relationship between the time allowed standing and the water content of a hollow fiber membrane is pre-determined, for example, using a sample cut-out in length of 3 to 5 cm, the water content at a given duration at room temperature can be obtained for the hollow fiber membrane actually used.

Further, since the water content may be adjusted by wiping the surface of a hollow fiber membrane with water absorption paper as described above, a method can be used in which the water content after wiping the surface of the hollow fiber membrane with water absorption paper is pre-determined.

Note that, as used herein, "the water content of a hollow fiber membrane" means "the water content of the periphery of a leakage region of a hollow fiber membrane", and "the periphery of a leakage region" means "a portion to which a repair agent is allowed to adhere for the purpose of closing the leakage region."

The water content represents a proportion of water included in a sample of interest expressed in units of percentage when the mass of the sample is taken as 100 mass %. It can be calculated by the following formula.

$$\text{Water content(mass \%)}=(\text{mass before drying}-\text{mass after drying})/\text{mass before drying}\times 100$$

In the above formula, the mass before drying represents the mass of a sample of a hollow fiber membrane which has been immersed and then removed from a hydrophilic liquid. Similarly, the mass after drying represents the mass of a sample of a hollow fiber membrane which has been immersed and then removed from a hydrophilic liquid followed by dried. Specifically, the mass after drying refers to the mass of a sample of a hollow fiber membrane which has been allowed to stand for 2 hours in a constant-temperature dryer set at 105° C., and subsequently removed from the dryer, and then immediately transferred into a desiccator of dry atmosphere to cool down for 40 to 60 minutes.

As explained above, in a case where a curable repair agent having multiple curing functions is used at the repair step of repairing a leakage region, the repair agent is advantageously cured in a short time so that the leakage region can be repaired quickly and uniformly, showing good repair workability as well as excellent strength and durability of the repaired place. Especially, when a repair agent having a moisture curing function and a light curing function as multiple curing functions is used, a hollow fiber membrane can be repaired without being dried with drying equipment.

In addition, the repaired place (the repair agent) well adheres to the hollow fiber membrane due to the combined effect of the moisture curing function and the light curing function, and a high degree of cross-linking can be achieved even in the inside of the repair agent. As a result, even when re-immersed in an untreated water tank, the repaired place neither swells nor deteriorates, but shows excellent strength and durability.

EXAMPLES

Below, referring to Examples, the present invention is described in detail.

Example 1

In an immersed hollow fiber membrane module comprising a large number of porous hollow fiber membranes (Mitsubishi Rayon Co., Ltd., inner diameter: 1000 μm and outer diameter: 2800 μm) where PVDF porous area is formed on a surface of PET (polyester) fibers fabricated in a hollow state by knitting, wherein these hollow fiber membranes are exposed, the followings were performed: (1) Leakage inspection, (2) repair of a leakage region and (3) leakage inspection and filtration operation after repairing.

(1) Leakage Inspection

The above mentioned hollow fiber membrane module was immersed in a hydrophilizing solution (Nissin Chemical Industry Co., Ltd., Olfine EXP4036, a 0.3 wt % aqueous solution, surface tension: 25.8 mN/m) for 10 minutes, once removed from the solution, and then re-immersed in a water tank. While keeping this state, pressurized air was injected into the hollow fiber membranes of the hollow fiber membrane module from the inside at 100 kPa to perform leakage inspection.

After marking a place where air bubbles developed from a hollow fiber membrane as a leakage region, water inside the hollow fiber membrane module was discharged, and then water droplets at and around the leakage region were wiped away with waste paper to an extent that water did not drop off. At that time, the water content of the periphery of the leakage region was 75% as determined by the data previously obtained from a sample of the hollow fiber membrane.

(2) Repair of the Leakage Region

As a repair agent having a moisture curing function and a light curing function, used was a cyanoacrylate based light curing instantaneous adhesive (Henkel, Loctite #4305) containing a photopolymerization initiator having the absorption maximum at 365 nm and ethyl-2-cyanoacrylate (the content in the adhesive is 95 mass %). The adhesive had a viscosity of 800 mPa·s at room temperature (23° C.)

The repair agent at 300 μL was dropped and applied so that the leakage region detected as described above was closed. Then, moisture contained in the thickness direction reacted with the applied repair agent to undergo primary curing (moisture curing).

Subsequently, a UV-LED lamp in which having high power ultraviolet LED from Nichia Corporation (an ultraviolet wavelength of 365 nm) was used to emit ultraviolet radiation over the applied repair agent to allow secondary curing. Irradiation strength was 30 mW·cm$^2$, and irradiation duration was 30 seconds.

(3) Leakage Inspection and Filtration Operation after Repairing

After repairing the leakage region as described above, leakage inspection (leakage re-inspection) was performed as in (1). The results showed that no air bubbles were developed, indicating that the leakage region was completely repaired.

Further, filtration operation was performed underwater for 1000 hours using the hollow fiber membrane module repaired as described above, and then leakage inspection was again performed. There was no development of air bubbles from the repaired leakage region. Leakage was not observed upon leakage inspection performed again in a similar fashion after performing additional filtration operation for up to 2000 hours.

Thus, according to the repair method of Example 1, the leakage region was able to be repaired completely and quickly, and the repaired place also showed sufficient durability and pressure resistance.

Example 2

(1) Leakage inspection, (2) repair of a leakage region and (3) leakage inspection and filtration operation after repairing were performed as in Example 1 except that a cyanoacrylate based adhesive (Henkel, Loctite #4304, viscosity: 20 mPa·s (at 23° C.)) was used as a repair agent, the adhesive having a moisture curing function and a light curing function, and containing a photopolymerization initiator and ethyl cyanoacrylate (the content in the adhesive was 95 mass %). There was no development of air bubbles upon leakage inspection after repairing, indicating that the leakage region was completely repaired. Further, filtration operation was performed as in Example 1 using the repaired hollow fiber membrane module, and then leakage inspection was performed after 1000 and 2000 hours. No leakage was observed in either of the cases.

Example 3

(1) Leakage inspection, (2) repair of a leakage region and (3) leakage inspection and filtration operation after repairing were performed as in Example 1 except that a cyanoacrylate based adhesive (Threebond, TB1773E, viscosity: 150 mPa·s (at 23° C.)) was used as a repair agent, the adhesive having a moisture curing function and a light curing function, and containing a photopolymerization initiator and ethyl cyanoacrylate (the content in the adhesive was 90 mass %). There was no development of air bubbles upon leakage inspection after repairing, indicating that the leakage region was completely repaired. Further, filtration operation was performed as in Example 1 using the repaired hollow fiber membrane module, and then leakage inspection was performed after 1000 and 2000 hours. No leakage was observed in either of the cases.

Example 4

(1) Leakage inspection, (2) repair of a leakage region and (3) leakage inspection and filtration operation after repairing were performed as in Example 1 except that a cyanoacrylate based adhesive (Threebond, 3056F, viscosity: 6000 mPa·s (at 23° C.)) was used as a repair agent, the adhesive having a moisture curing function and a light curing function, and containing a photopolymerization initiator and ethyl cyanoacrylate (the content in the adhesive was 90 mass %).

Since the repair agent used had high viscosity, the repair agent was not easily able to permeate the hollow fiber membrane during repair. Nonetheless, there was no development of air bubbles upon leakage inspection after repairing, indicating that the leakage region was completely repaired. However, when filtration operation was performed using the repaired hollow fiber membrane module as in Example 1, and leakage inspection was again performed after 1000 hours and 2000 hours, leakage was observed from the edge of the repair agent after 2000 hours. This appears to result from the following reasons: for example, a sufficient anchor effect was not obtained because the repair agent had high viscosity, and the repair agent was not easily able to permeate the hollow fiber membrane; sufficient ultraviolet light did not reach the deep part of the repair agent, resulting in somewhat weak curing at the interface between the membrane surface of the hollow fiber membrane and the repair agent because the repair agent had high viscosity, and the thickness of the applied repair agent was thick.

Example 5

(1) Leakage inspection, (2) repair of a leakage region and (3) leakage inspection and filtration operation after repairing were performed as in Example 1 except that a silicone based adhesive (Henkel, Loctite#5248, viscosity: 50000 mPa·s (at 23° C.)) was used as a repair agent, the adhesive having a moisture curing function and a light curing function, and containing a photopolymerization initiator and a polymerizable silicon-containing component.

Since the repair agent used had high viscosity, the repair agent was not easily able to permeate the hollow fiber membrane during repair. Nonetheless, there was no development of air bubbles upon leakage inspection after repairing, indicating that the leakage region was completely repaired. However, when filtration operation was performed using the repaired hollow fiber membrane module as in Example 1, and leakage inspection was again performed after 1000 hours and 2000 hours, leakage was observed from the edge of the repair agent after 2000 hours. This appears to result from the following reasons: for example, a sufficient anchor effect was not obtained because the repair agent had high viscosity, and the repair agent was not easily able to permeate the hollow fiber membrane; sufficient ultraviolet light did not reach the deep part of the repair agent, resulting in somewhat weak curing at the interface between the membrane surface of the hollow fiber membrane and the repair agent because the repair agent had high viscosity, and the thickness of the repair agent applied was thick.

Example 6

(1) Leakage inspection, (2) repair of a leakage region and (3) leakage inspection and filtration operation after repairing were performed as in Example 1 except that a cyanoacrylate based adhesive (Threebond, TB1771E, viscosity: 2 mPa·s (at 23° C.)) was used as a repair agent, the adhesive having a moisture curing function and a light curing function, and containing a photopolymerization initiator and ethyl cyanoacrylate (the content in the adhesive was 90 mass %).

Although fully penetrated the hollow fiber membrane during repair, the repair agent used broadly spread around the leakage region due to very low viscosity, and the repair agent applied only formed an about 1/10 of thickness as compared with that in Example 1. There was no development of air bubbles upon leakage inspection after repairing, indicating that the leakage region was completely repaired. However, when filtration operation was performed using the repaired hollow fiber membrane module as in Example 1, and leakage inspection was again performed after 1000 hours and 2000 hours, leakage was observed from the edge of the repair agent after 2000 hours. This appears to result from the following reason: a sufficient anchor effect was not obtained because a sufficient thickness of the repair agent was not achieved due to low viscosity of the repair agent.

Comparative Example 1

(1) Leakage inspection and (2) subsequent repair of a leakage region as described above were attempted as in Example 1 except that acrylic ultraviolet curing resin (Henkel, Loctite#3555, viscosity: 150 mPa·s (at 23° C.)) having an ultraviolet curing function only was used as a repair agent. However, the acrylic ultraviolet curing resin cured by ultraviolet irradiation after applied was detached from the leakage region, and repair itself was not possible.

Note that separately, after the leakage inspection in (1), the leakage region was repaired with acrylic ultraviolet curing resin (Henkel, Loctite #3555) once the leakage region was marked and sufficiently dried. In that case, no leakage was observed upon subsequent re-inspection of leakage (3).

Comparative Example 2

(1) Leakage inspection, (2) repair of a leakage region and (3) leakage inspection after repairing were performed as in Example 1 except that a cyanoacrylate based instantaneous adhesive (Henkel, Loctite #406, viscosity: 100 mPa·s (at 23° C.)) having a moisture curing function only was used as a repair agent. However, ultraviolet irradiation was not performed in (2) repair of a leakage region. However, when (3) leakage inspection after repairing (leak re-inspection) was performed, the repair agent at the repaired place gradually swelled to expose the leakage region. Therefore, filtration operation was not able to be performed.

Comparative Example 3

(1) Leakage inspection, (2) repair of a leakage region and (3) leakage inspection after repairing were performed as in Example 1 except that a hot melt adhesive (Henkel, Macroplast QR3460, viscosity: 11,000 mPa·s (at 120° C.), solid at room temperature (at 23° C.)) having a moisture curing function was used as a repair agent. However, ultraviolet irradiation was not performed in (2) repair of a leakage region. When (3) leakage inspection after repairing (leak re-inspection) was performed, the repair agent at the repaired place was gradually detached to expose the leakage region. Therefore, filtration operation was not able to be performed. This appears to be because moisture did not permeate the interior region of the repair agent, resulting in poor curing at the interior region of the repair agent. Further, because the hot melt adhesive used was not easily able to permeate in the thickness direction due to its high viscosity, the anchor effect was also insufficient.

Comparative Example 4

(1) Leakage inspection, (2) repair of a leakage region and (3) leakage inspection after repairing were performed as in Example 1 except that a hot melt adhesive (DIC, TYFORCE EXPDC-200, viscosity: 4000 mPa·s (at 120° C.), solid at room temperature (at 23° C.)) having an ultraviolet curing function was used as a repair agent. However, when (3) leakage inspection after repairing (leak re-inspection) was performed, the repair agent at the repaired place was gradually detached to expose the leakage region. Therefore, filtration operation was not able to be performed. This appears to be because the hot melt adhesive did not well adhere to the leakage region of the hollow fiber membrane which was not dried.

TABLE 1

| | Product Name of Repair Agent | Curing Function of Repair Agent | Viscosity of Repair Agent before Curing (mPa·s) | Leak Re-inspection After 1000 hours | Leak Re-inspection After 2000 hours |
|---|---|---|---|---|---|
| Example 1 | Loctite #4305 | Moisture curing function and ultraviolet curing function | 800 (23° C.) | ○ | ○ |
| Example 2 | Loctite #4304 | Moisture curing function and ultraviolet curing function | 20 (23° C.) | ○ | ○ |
| Example 3 | Threebond TB1773E | Moisture curing function and ultraviolet curing function | 150 (23° C.) | ○ | ○ |
| Example 4 | Threebond 3056F | Moisture curing function and ultraviolet curing function | 6000 (23° C.) | ○ | X |
| Example 5 | Loctite #5248 | Moisture curing function and ultraviolet curing function | 50000 (23° C.) | ○ | X |
| Example 6 | Threebond TB1771E | Moisture curing function and ultraviolet curing function | 2 (23° C.) | ○ | X |
| Comparative Example 1 | Loctite #3555 | Ultraviolet curing function only | 150 (23° C.) | Inspection impossible | Inspection impossible |
| Comparative Example 2 | Loctite #406 | Moisture curing function only | 100 (23° C.) | Inspection impossible | Inspection impossible |
| Comparative Example 3 | Macroplast QR3460 | Moisture curing function only (Hot melt resin) | 11.000 (120° C.) Solid (23° C.) | Inspection impossible | Inspection impossible |
| Comparative Example 4 | DIC TYFORCE EXPDC-200 | Ultraviolet curing function only (Hot melt resin) | 4.000 (120° C.) Solid (23° C.) | Inspection impossible | Inspection impossible |

○: No leakage
X: Leaked

EXPLANATION OF REFERENCE NUMERALS

10 Hollow fiber membrane module
11 Hollow fiber membrane
20a, 20b Water catchment pipe
30 Leakage region
40 Repair agent

The invention claimed is:

1. A method of repairing a leakage region occurring at a hollow fiber membrane module, the method comprising
contacting the leakage region with a repair agent that comprises a moisture curing function, a light curing function, a cyanoacrylate based component, a polymerizable silicon-containing component, and a photopolymerization initiator while the hollow fiber membrane module is wet, and
curing the repair agent with moisture contained in a hollow fiber membrane of the hollow fiber membrane module and light,
wherein the cyanoacrylate based component is present in an amount of 85 to 90 mass % relative to 100 mass % of the repair agent,
a wherein the polymerizable silicon-containing component is vinyltrimetoxysilane,
wherein the repair agent has a viscosity of between 10 and 3000 mPa·s at room temperature,
wherein the hollow fiber membrane of the hollow fiber membrane module has a water content of 30 mass % or more and 90 mass % or less when the contacting is performed, and
wherein the cyanoacrylate based component comprises one or more cyanoacrylate monomers selected from the group consisting of methyl cyanoacrylate, ethyl-2-cyanoacrylate, propyl cyanoacrylate and a combination thereof.

2. The method of claim 1, wherein the contacting is performed after detecting the leakage region by pressurizing gas into the hollow fiber membrane module in a direction along filtration of the hollow fiber membrane module or in a direction opposite to the filtration under a condition where the hollow fiber membrane module is immersed in water or an aqueous solution.

3. The method of claim 1, wherein the leakage region is a defective place in a membrane surface of a hollow fiber membrane of the hollow fiber membrane module, and
the contacting comprises applying the repair agent to the defective place.

4. The method of claim 1, wherein the repair agent has a viscosity of between 10 and 1000 mPa·s at room temperature before curing.

5. The method of claim 1, wherein the repair agent has a viscosity of between 100 and 1000 mPa·s at room temperature before curing.

6. The method of claim 1, wherein the photopolymerization initiator has a reaction wavelength between 100 and 400 nm.

7. The method of claim 1, wherein the light is ultraviolet light.

8. The method of claim 1, wherein the cyanoacrylate based component comprises ethyl-2-cyanoacrylate.

* * * * *